(12) United States Patent
Jones

(10) Patent No.: US 6,907,952 B2
(45) Date of Patent: Jun. 21, 2005

(54) CRUISE CONTROL BIKE

(76) Inventor: Diane Drayden Jones, 1627 Plumwood Dr., Houston, TX (US) 77014

( * ) Notice: Subject to any disclaimer, the term of this patent is extended or adjusted under 35 U.S.C. 154(b) by 53 days.

(21) Appl. No.: 10/115,390

(22) Filed: Apr. 3, 2002

(65) Prior Publication Data

US 2002/0100628 A1 Aug. 1, 2002

Related U.S. Application Data

(63) Continuation-in-part of application No. 09/659,406, filed on Aug. 11, 2000, now abandoned.

(51) Int. Cl.[7] ........................... B62K 11/00; B62K 11/14
(52) U.S. Cl. .................. 180/205; 74/551.1; 135/88.01; 180/170; 297/215.11; 297/215.12
(58) Field of Search ............................... 180/205, 206, 180/207, 219, 220, 170, 178, 65.1, 65.5, 65.8; 297/215.1, 215.11, 215.12; 74/551.1; 340/432; 280/288.4; 135/88.03, 88.01

(56) References Cited

U.S. PATENT DOCUMENTS

| | | | | |
|---|---|---|---|---|
| 620,688 A | * | 3/1899 | Wood ........................ 297/373 |
| 636,222 A | * | 10/1899 | Killen ........................ 297/375 |
| 1,139,184 A | * | 5/1915 | Johnson ................. 297/215.12 |
| 3,425,745 A | * | 2/1969 | Michels ................. 297/215.11 |
| 3,970,345 A | * | 7/1976 | Holcomb ............... 297/215.11 |
| 4,466,660 A | * | 8/1984 | Mabie .................... 297/215.11 |
| RE33,178 E | * | 3/1990 | Ahlberg ................... 280/801.2 |
| 4,966,247 A | * | 10/1990 | Masuda ....................... 180/171 |
| 5,141,067 A | * | 8/1992 | Diggs ........................... 180/11 |
| 5,145,210 A | * | 9/1992 | Lennon ................... 280/281.1 |
| 6,060,985 A | * | 5/2000 | Siviero ....................... 340/461 |
| 6,157,297 A | * | 12/2000 | Nakai ......................... 340/461 |
| 6,206,399 B1 | * | 3/2001 | Schnitzenbaumer ..... 280/304.4 |
| 6,290,014 B1 | * | 9/2001 | MacCready, Jr. ........... 180/205 |
| 6,446,745 B1 | * | 9/2002 | Lee et al. ................... 180/206 |

\* cited by examiner

*Primary Examiner*—Anne Marie Boehler

(57) ABSTRACT

A bicycle having a cruise control system and various components designed to prevent discomfort and fatigue are disclosed. The cruise control bicycle preferably includes a flexion handlebar, a parallel brake lever, a removable bicycle backrest, and an adjustable sun protector that attaches to the backrest.

16 Claims, 2 Drawing Sheets

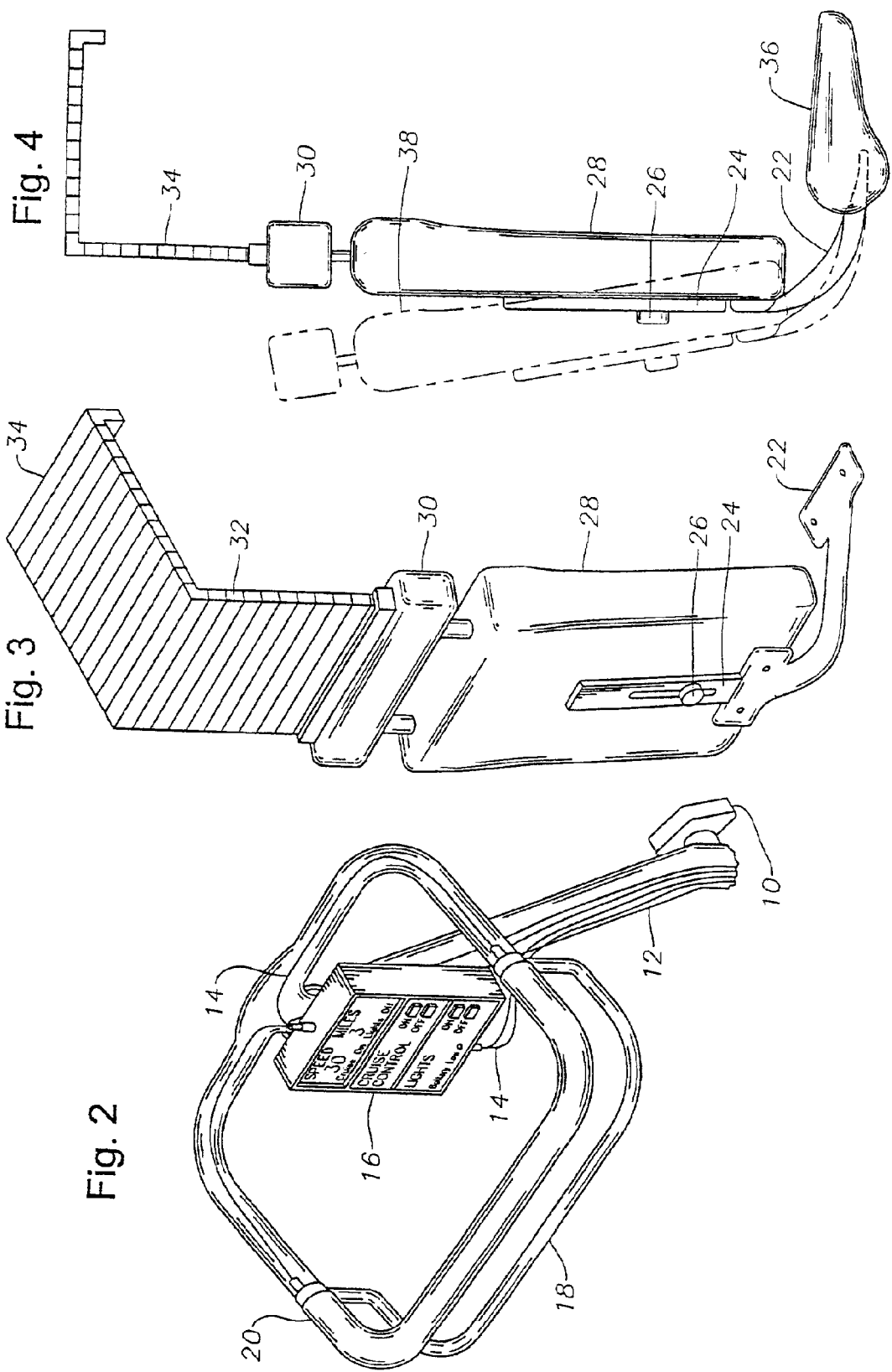

CRUISE CONTROL BIKE

CROSS-REFERENCE TO RELATED APPLICATIONS

This application is a continuation-in-part of U.S. patent application Ser. No. 09/659,406, filed Aug. 11, 2000 entitled *DJ2000 Cruise Control Bike*.

STATEMENT REGARDING FEDERALLY SPONSORED RESEARCH OR DEVELOPMENT

Not Applicable.

BACKGROUND OF THE INVENTION

1. Field of the Invention

This invention relates generally to a fully loaded bicycle, and more specifically to bicycles that are used for long-distance biking, mountain biking, cross-country riding, bike touring, and biking as a secondary means of transportation.

2. Description of the Related Art

Bike lovers have experienced the pleasures of biking and the exhilaration of achieving goals, while enduring much discomfort, pain, fatigue, and potential health risks. A limited number of prior inventions have been created to resolve the problem of discomfort, pain, fatigue, and safety concerns associated with biking. Most of these inventions, such as a great number of bicycle seats and handlebars, have specifically focused on the problem of discomfort. Unfortunately, these inventions have only partially resolved the problem.

For example, U.S. Pat. No. 3,719,252 discloses a readily attachable and detachable portable tree seat of requisite size and shape for convenient use and support by a hunter. However, the tree seat is limited in scope because it is specifically designed to meet the needs of a hunter versus providing support to bikers in a more universal sense.

Likewise, the bicycle seat in U.S. Pat. No. 4,182,508 is provided with a compression spring to act as a cushion for the bicycle seat. However, a cushion seat does not support the back muscles, relieve the back of strain and fatigue, or provide support for muscle strength and endurance.

Additionally, the bicycle seat in U.S. Pat. No. 5,911,474 is provided with seat attachments comprised of a right support section, a left support section, and an attachment device. The attachment device connects the right support section and the left support section to the bicycle seat post. The right and left support sections form a support platform for the buttocks of the bike rider. The central portion of the support platform has a recess to accommodate the cyclist's genitalia. This invention only provides support to the buttocks and genitalia and does not prevent strain and fatigue to the back muscles.

The bicycle seat brace in U.S. Pat. No. 3,586,348 consists of a brace elevated behind the back of the cyclist to support and secure a sign for commercial advertising purposes. This brace does not provide comfort and support to the cyclist's back muscles. In addition to the various bicycle seat designs of the prior art, it would be desirable for a bicycle seat to include a backrest that is ergonomically designed to support the main structures of the back by positioning the spine at the proper angle for comfort and support of the back muscles. It would also be desirable for the backrest to be adjustable to the position preferred by the individual cyclist.

Various styles of handlebars have also been invented to address discomfort. Again, these inventions only partially resolve the problem. For example, the handlebar in U.S. Pat. No. 5,000,469 includes an adjustable support pad assembly that provides support to the cyclist's body at the forearms or elbow, but does not aid in positioning the body upright. Similarly, the handlebar design disclosed in U.S. Pat. No. 4,471,209 has electrically heated handgrips for motorcycles, which provides comfort and supports the hands for gripping purposes. Also, U.S. Pat. No. 4,528,865 discloses a handlebar system comprising a left-hand and right-hand handlebar, each being substantially L-shaped and adjustable. Each of these handlebar systems only offers support for the hands or arms. Therefore, it would be beneficial to provide handlebars with an ergonomic design that enables the cyclist to get a good grip, maneuver the bicycle easily, and elevate the back upright.

In the field of motor vehicles, such as cars and motorcycles, cruise control was added to address issues associated with fatigue when driving long distances. For example, U.S. Pat. No. 5,781,103 discloses a cruise control system for a motor vehicle. When the cruise control is engaged, it informs the driver to decide whether to take control of the vehicle from the cruise control system. U.S. Pat. No. 6,064,937 includes a system that detects and generates signals regarding vehicle speed, power consumption, and cruise control selections. Further, U.S. Pat. No. 5,893,295 discloses a cruise control for a motorcycle comprising a throttle device mounted on one end of a motorcycle handlebar. It would be beneficial to provide a cruise control system for a bicycle that allows the cyclist to rest while maintaining speed to travel the desired distance.

The present invention addresses the deficiencies of the prior art.

SUMMARY OF THE INVENTION

The present invention includes features that address the problems of discomfort, pain, and safety that have not been fully resolved by the prior art. The preferred embodiment of the present invention include flexion handlebars covered with a synthetic plastic for the resistance of sweat. The handlebars are preferably rectangular or square in shape to provide a good gripping surface and to help elevate the back upright. A light metal parallel brake-lever is preferably connected to the lower front portion of the handlebars for easy gripping. The handlebars and brake-lever are preferably connected to a tilted handle stem.

In another aspect, the preferred embodiment of the present invention also includes an ergonomically designed backrest to support back muscles and prevent strain and fatigue to the back and neck. The backrest supports the main structures of the back by positioning and relaxing the spine at the proper angle, preferably 90 degrees. Also, the backrest is preferably adjustable backward, upward, and downward by the cyclist to meet their preferences. The backrest allows greater muscle endurance by providing a firm, soft, and comfortable cushion back support. It is designed to be thin and lightweight to increase momentum and durability for weather resistance.

In yet another aspect, the preferred embodiment of the present invention includes a unique adjustable sun-protector that provides safety and protection against injuries that include sunburns, skin irritation, skin cancer, and impairment of visibility. It is also preferably weather resistant, detachable, and easy to fold-up or down.

In still another aspect, the preferred embodiment of the present invention includes a cruise control system for a bicycle that allows the rider to maintain a programmable speed up to 30 mph or more while resting, thereby alleviating muscle strain and fatigue. Additionally, the cruise control system is preferably battery-operated, thereby making it environmentally safe.

Thus, the present invention comprises a combination of features and advantages which enable it to overcome various problems of prior devices. The various characteristics described above, as well as other features, will be readily apparent to those skilled in the art upon reading the following detailed description of the preferred embodiments of the invention, and by referring to the accompanying drawings.

BRIEF DESCRIPTION OF THE DRAWINGS

For a more detailed description of the preferred embodiment of the present invention, reference will now be made to the accompanying drawings, wherein:

FIG. 2 is an isometric close-up side view of the handlebars and cruise control panel of the preferred embodiment of the present invention;

FIG. 3 is an isometric back view of the backrest and sun-protector of the preferred embodiment of the present invention.

FIG. 4 is a side view of the backrest and sun-protector of the preferred embodiment of the present invention that depicts the angular adjustment maneuverability of the backrest.

DETAILED DESCRIPTION OF THE PREFERRED EMBODIMENT

Figure 1:
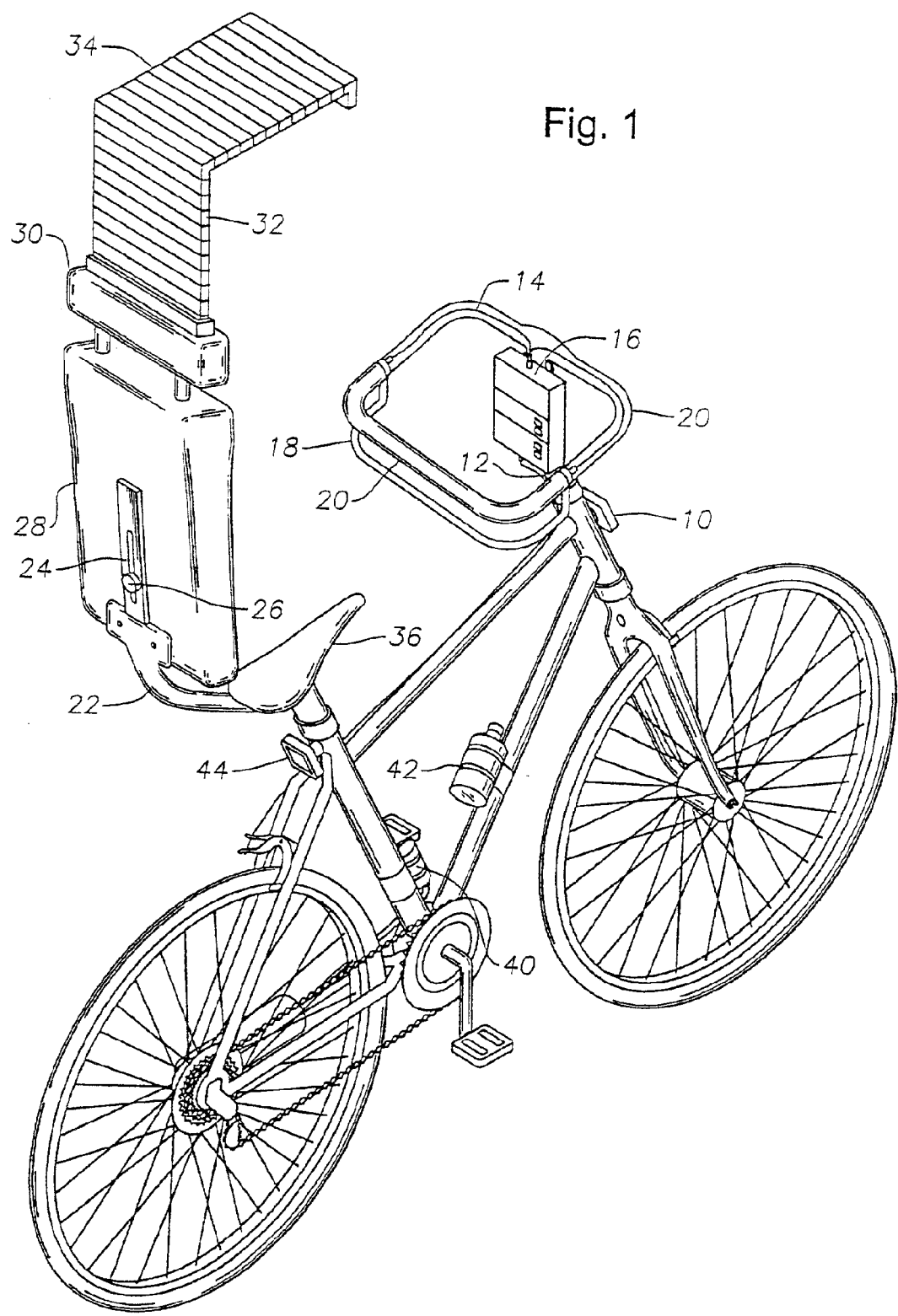
FIG. 1 is an isometric side view of a bicycle that includes the various features of the preferred embodiment of the present invention.

An overall view of a bicycle design that includes the preferred features of the present invention is shown in FIG. 1. A typical embodiment of the front view consists of front electronic lights (10) connected to the front bar. The electronic lights (10) will typically operate from a 10 watt turbo CAD rechargeable battery. Attached to the top of the tilted handle stem (12), which is directed inward and tilted downwardly toward the cyclist, is the flexion handlebar (20), having a preferably rectangular or square shape. A parallel brake lever (18) is connected below the handlebar (20) directly in front of the rider. The parallel brake lever (18) is preferably a thin metal bar that when pressed upward, stops the bike. An electronic cruise control digital panel (16) is preferably connected on the inside of the flexion handlebar (20). FIG. 1 also shows the wire (14), which connects between the digital panel (16) and the cruise control battery (40) attached to the seat post. The wire (14) also connects to the rear electronic lights (44). The battery (40) connects through a wiring harness to a motor gear box shown in FIG. 1 connected to the rear derailler at the back tire of the bicycle. Directly across from the cruise control battery (40) and attached to the bike tube, a standard size bottle holder (42) may be provided.

The seat (36) illustrated in FIG. 1 is preferably a gel seat because of its comfort and durability for long distance traveling. A metal spring seat attachment (22) is connected to both the seat post and to a backrest (28). A vertical metal bar (24) with a slot is attached to the backrest (28), and a backrest adjustment knob (26) is disposed within the slot. On top of the backrest (28), a headrest (30) is preferably provided that includes storage space for an adjustable sun protector (34) comprising protector folds or rods (32) that are preferably ½ inch wide.

An illustration of the flexion handlebar (20) is shown in FIG. 2. The flexion handlebar (20) is preferably square or rectangular in shape and connected at the top of the tilted handle stem (12). The handlebar (20) is covered by a synthetic plastic material to resist sweat from the palms of the rider's hands and for comfort in grasping the handlebar (20) when traveling long distances. The shape of the handlebar (20) allows for resting of the hands and easy maneuvering for steering. Below the flexion handlebar (20) and facing directly in front of the rider is the parallel brake lever (18). The parallel brake lever (18) allows for convenient use of the brakes and comprises a thin bar that when pressed upward, stops the bike. The electronic cruise control digital panel (16) is connected to the inside of the flexion handlebar (20). Its primary function is to activate at least the cruise control operation, lights, and battery indicator, and may include other functions such as the date and time. The electronic cruise control panel (16) preferably includes an on button and an off button for operating the cruise control. Also shown in FIG. 1 and FIG. 2 is the wire (14) that connects between the digital panel (16) and the battery (40), which is attached to the seat post. The battery (40) connects to the rear derailler and cantilever brakes of the bike via additional wires.

The backrest (28) connects to the metal seat attachment (22) as shown in FIG. 3. The backrest (28) is preferably covered in durable black vinyl and padded with thin cushion foam to provide comfort. It is ergonomically designed to provide back support at the proper angle, preferably 90 degrees, which reduces strain and relaxes muscles in the upper body. The backrest adjustment knob (26) allows for personalized adjustment of the backrest (28). When a rider gently relaxes his or her back muscles against the backrest (28) it will move firmly backwards at an angle as shown in dashed lines in FIG. 4. The metal seat attachment (22) maintains a neutral position of the backrest (28) at approximately 90 degrees, and enables the backrest (28) to tilt to an angle up to approximately 110 degrees depending upon how much pressure the cyclist exerts when leaning into the backrest (28). To provide comfort and proper height adjustment, the backrest adjustment knob (26) may be turned to the right to loosen the knob (26) to allow the backrest (28) to be moved upward or downward. The slot within which the knob (26) moves preferably allows for approximately 10 inches or more of vertical adjustment. The knob (26) should be turned to the left to tighten the knob (26) and secure the backrest (28) in the desired position.

On top of the backrest (28), a headrest (30) is preferably provided, with an adjustable sun protector (34) connected thereto. The sun protector (34) comprises a plurality of protection rods or folds (32) that enable an upward and downward motion of the protector (34). The folds (32) are preferably made of metal and covered with vinyl plastic, but could be made of other durable, weather resistant materials. The protector (34) is preferably provided with an adequate number of folds (32) so that the protector (34) can easily adjust to a height sufficient to accommodate a seated rider that is six feet tall or more.

Referring now to FIG. 1 and FIG. 2, to use the cruise control bike, the rider would first adjust the seat (36) to the proper height by unscrewing the side bolt and lifting the seat up or down until the rider's feet touch the pavement firmly. Then the height of the backrest (28) would be adjusted by turning the backrest adjustment knob (26) and sliding the backrest (28) up or down as necessary before securing the desired position by tightening the knob (26) with respect to the vertical metal bar (24). Next, the flexion handlebar (20) would be adjusted by holding the handlebar (20), unscrewing the bolt on the side, and pulling the handlebar (20) up or down so that the rider's hands can grip handlebar (20) without straining. As shown in FIG. 3 and FIG. 4, the adjustable sun protector (34) can optionally be adjusted to extend over the rider's head by gently pulling the folds (32) upwardly to the proper height and then horizontally so that they stretch over the bicycle seat (36).

Accordingly, the preferred embodiment of the present invention provides ergonomic support in four critical ways:
(1) Height—the height of the seat (36) can be changed,
(2) Back Support—the backrest (28) can be adjusted to provide support at the actual curve of the lumbar back,
(3) Pelvic Angle—the angle of the backrest (28) can be changed, and
(4) Arm Support—the flexion handlebar (20) offers horizontal and vertical support.

Endurance is the ability to continue to ride and exert force after fatigue has occurred. The length of time in which force can be exerted depends on the proportion of the available strength being exerted. The smaller the force that is required, the longer it can be exerted. However, fatigue is an important aspect of any situation in which the cyclist (both dynamic and static) is engaged. Depending on the degree of fatigue experienced, it can cause discomfort, distraction, dissatisfaction, and under performance. In many cases, these factors rapidly lead to accidents.

In order for a muscle to contract (to do the work) an extremely complicated chemical reaction is set up in the muscle itself. Adenosine triphostate (ATP), a chemical located in the muscles, supplies the energy for contraction. This chemical breaks down to adenosine diphosphate (ADP). However, the ADP must be regenerated to ATP before further contractions can occur. The energy for this reversing action is provided by the breakdown of glycogen. Unfortunately, a main by-product of the glycogen breakdown is a substance called lactic acid. Lactic acid quickly accumulates in the muscles causing muscle pain often associated with fatigue.

The preferred embodiments of the present invention provide cruise control to assist the rider during times of fatigue. To utilize the cruise control feature, the rider should first check the light on the electronic cruise control panel (16) to ensure that the rechargeable cruise control battery (40) has been charged properly. The rechargeable cruise control battery (40) may be recharged by connecting the battery (40) to an adapter and then plugging it in to an electrical outlet for several hours. The bike is operable without the rechargeable battery (40), but the cruise control system and the lights (10, 44) will not activate. The cruise control battery (40) is uniquely designed through a wiring harness that connects to the motor gear box shown behind the back tire of the bicycle in FIG. 1. The battery (40) supplies power to the motor gear box, which transfers power to the rear wheel derailler, thereby causing the back tire to keep turning. The cruise control can be activated when riding at any rate of speed by pressing the on button located on the electronic cruise control panel (16). The cruise control can be turned off by either pressing the off button on the panel (16) or by pressing the parallel brake lever (18) until the "cruise control off" displays on the panel (16).

In summary, several objects and advantages of the preferred embodiments of the present invention are notable. Namely, a cruise control system is preferably provided to maintain speed and distance, while allowing the cyclist to rest from time to time, and the cruise control system is preferably operated by a battery (40) to avoid polluting the environment. A backrest (28) is also preferably provided that can be adjusted backward, upward, and downward. In addition to providing comfort and rest for the back, it is ergonomically designed to protect against back strain, neck strain, muscle strain, and fatigue. A flexion handlebar (20) that is preferably square or rectangular in shape is wrapped with synthetic plastic material. Therefore, the handlebar (20) is designed to absorb sweat, to allow sufficient grip, to assist in positioning the body upright, and to protect against carpal tunnel syndrome. A parallel brake lever (18) is also preferably connected below the flexion handlebars (20) and directly in front of the cyclist. An adjustable sun protector (34) is preferably included to provide weather protection to the cyclist on sunny and rainy days. Specifically the protector (34) protects the cyclist against impairment of visibility, sunrays, and heat injuries that include sunburns, skin irritation, and skin cancer. Accordingly, the various features of the preferred embodiments of the present invention are directed to solving the problems of discomfort, pain, and potential health risks, as well as to provide ease, convenience, and comfort to long-distance bicyclists.

While preferred embodiments of this invention have been shown and described, modifications thereof can be made by one skilled in the art without departing from the spirit or teaching of this invention. The embodiments described herein are exemplary only and are not limiting. Many variations and modifications of the system and apparatus are possible and are within the scope of the invention. For example, the adjustable sun protector and the backrest are detachable and their use is at the cyclist's discretion. Accordingly, the scope of protection is not limited to the embodiments described herein, but is only limited by the claims that follow, the scope of which shall include all equivalents of the subject matter of the claims.

What is claimed is:

1. A bicycle having a cruise control system comprising:
   a bicycle instrument panel;
   a cruise control motor that is powered by a battery; and
   a brake that deactivates the cruise control motor and causes the bicycle to operate as a normal pedaling bicycle;
   wherein the bicycle instrument panel includes means for selectively turning the motor on to cause the bicycle to operate as a cruise control bicycle;
   wherein said brake is selectively operable via a brake lever connected to a handlebar; and
   wherein said handlebar further comprises:
   a gripping member;
   a front portion connected to a bicycle steering post that is tilted slightly downwardly; and
   a rearward portion providing a substantially horizontal handgrip;
   wherein said gripping member has a rectangular shape.

2. The bicycle of claim 1 wherein said instrument panel includes a display for monitoring bicycle speed.

3. The bicycle of claim 1 wherein said instrument panel includes a control for operating at least one light on the bicycle.

4. The bicycle of claim 1 wherein said instrument panel includes a display for monitoring the battery.

5. The bicycle of claim 1 wherein said battery is connected to said motor via a wire.

6. The bicycle of claim 1 wherein said handlebar further includes at least one lateral portion connecting the rearward portion with the front portion.

7. The bicycle of claim 1 wherein said instrument panel is attached to the front portion of the handlebar.

8. The bicycle of claim 1 wherein the brake lever comprises a bar disposed below the rearward portion of the handlebar.

9. The bicycle of claim 1 further comprising:

a backrest support member that may be adjusted vertically by loosening a knob and sliding the backrest support member up or downward; and a sun-protector device connected to the backrest support member;

wherein said sun-protector device is adjustable to extend horizontally over a bicycle seat.

10. The bicycle of claim 9 further including a pivotal member that enables angular movement of said backrest support member with respect to said bicycle seat.

11. The bicycle of claim 9 wherein tightening said knob prevents vertical adjustment of said backrest support member.

12. A bicycle having a cruise control system comprising:

a bicycle instrument panel;

a cruise control motor that is powered by a battery;

a brake that deactivates the cruise control motor and causes the bicycle to operate as a normal pedaling bicycle;

wherein the bicycle instrument panel includes means for selectively turning the motor on to cause the bicycle to operate as a cruise control bicycle;

a backrest support member that may be adjusted vertically by loosening a knob and sliding the backrest support member up or downward; and a sun-protector device connected to the backrest support member;

wherein the sun-protector device is adjustable to extend horizontally over a bicycle seat; and a headrest attached to said backrest support member.

13. The bicycle of claim 12 wherein said sun-protector device comprises a plurality of rods connected together.

14. The bicycle of claim 13 wherein said rods comprise vinyl-covered metal.

15. The bicycle of claim 13 wherein said rods may be collapsed into a stacked position for storage.

16. A bicycle having a cruise control system comprising:

a bicycle instrument panel;

a cruise control motor that is powered by a battery;

a brake that deactivates the cruise control motor and causes the bicycle to operate as a normal pedaling bicycle;

wherein the bicycle instrument panel includes means for selectively turning the motor on to cause the bicycle to operate as a cruise control bicycle;

a backrest support member that may be adjusted vertically by loosening a knob and sliding the backrest support member up or downward; and a sun-protector device connected to the backrest support member;

wherein said sun-protector device is adjustable to extend horizontally over a bicycle seat;

wherein said sun-protector device comprises a plurality of rods connected together;

wherein said rods may be collapsed into a stacked position for storage; and wherein said rods may be stored within a headrest attached to said backrest support member.

* * * * *